Aug. 8, 1933.  H. VANDERPLOEG  1,921,209
HOOK-ENDED COILED SPRING
Original Filed July 18, 1929   3 Sheets-Sheet 1
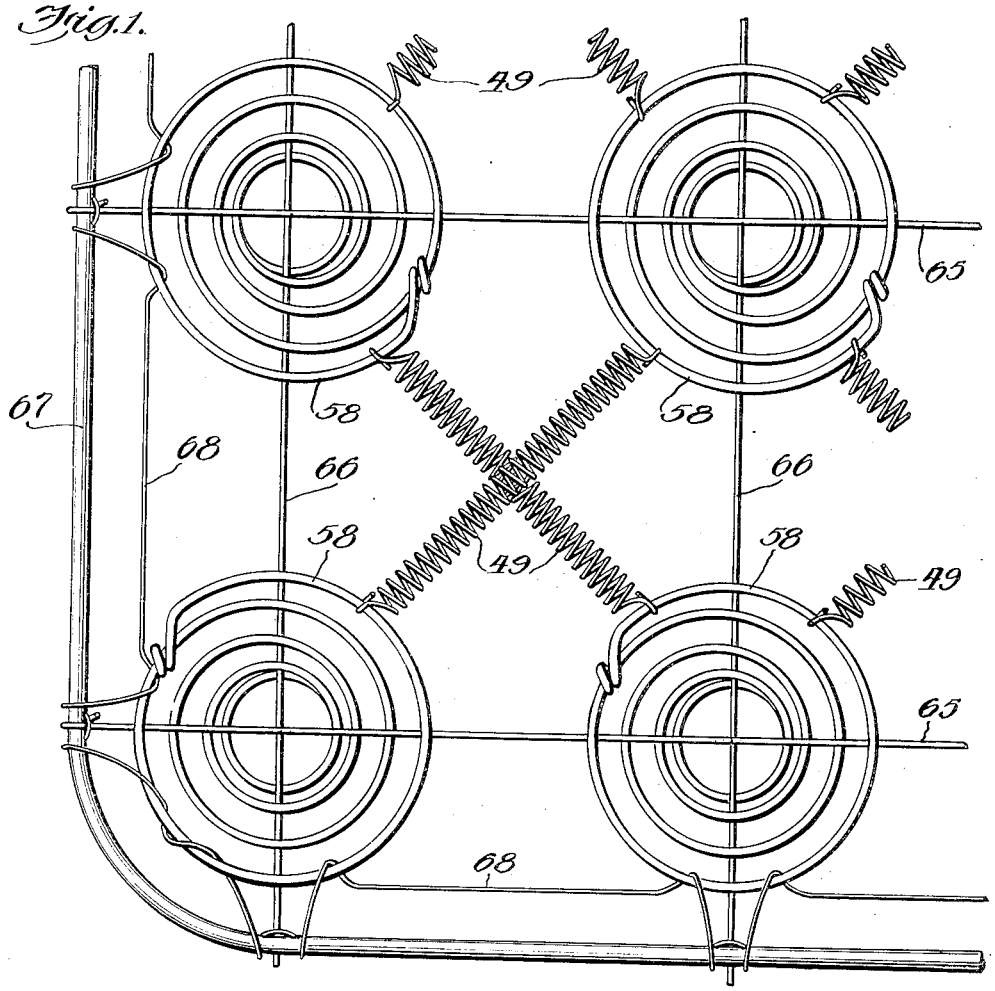
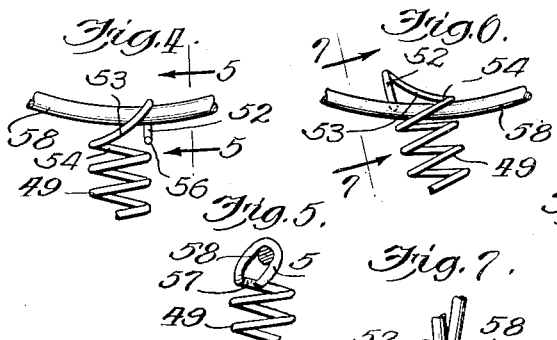
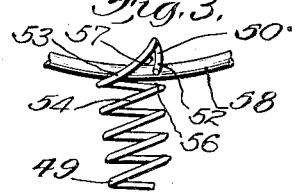
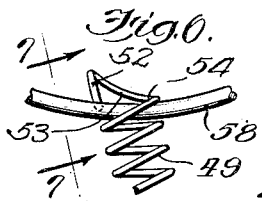
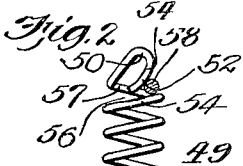
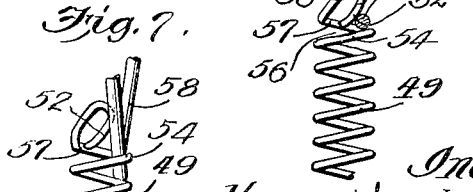
Inventor:
Henry Vanderploeg
By Williams, Bradbury,
McCaleb & Hinkle
Attys.

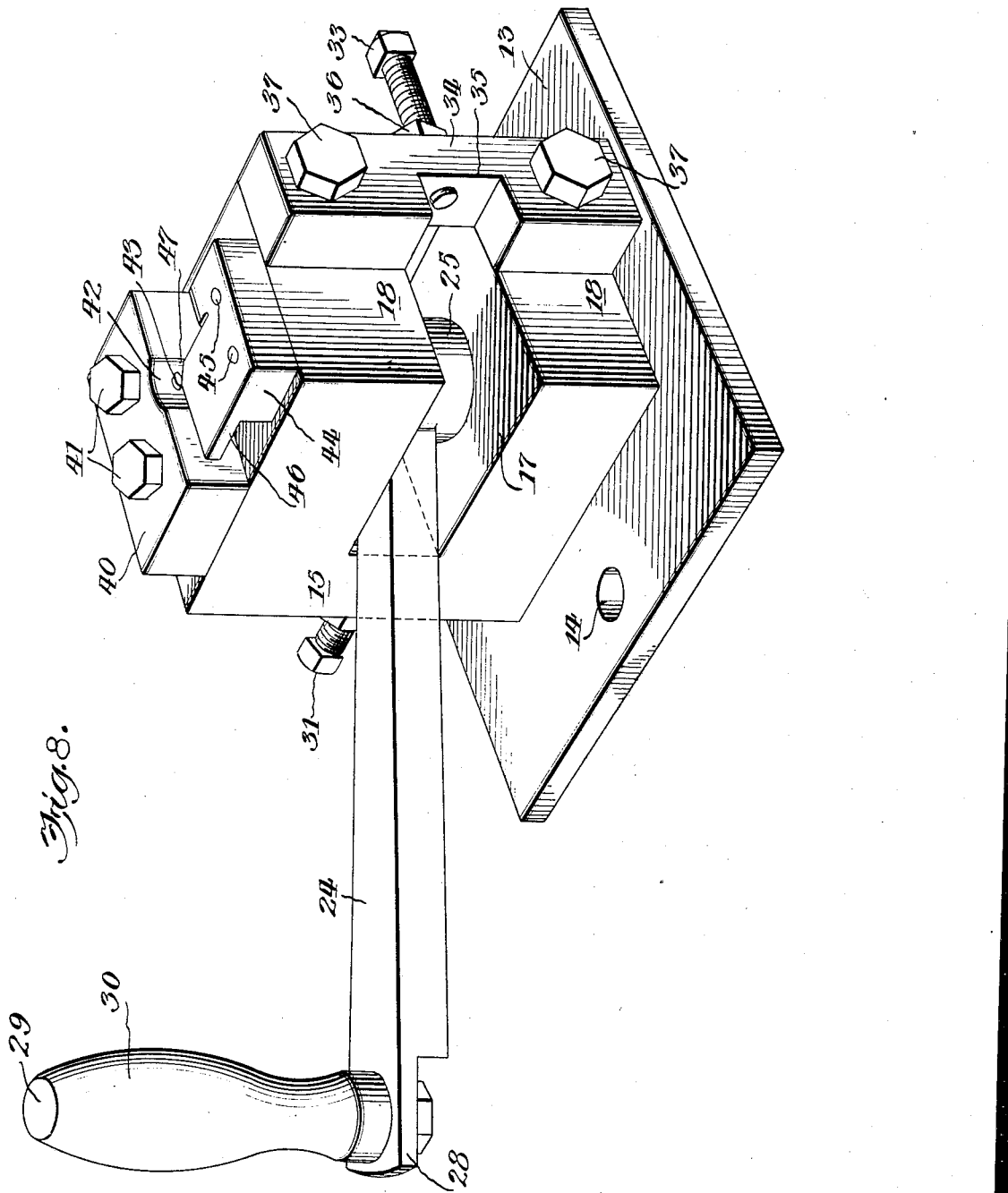

Aug. 8, 1933.  H. VANDERPLOEG  1,921,209
HOOK-ENDED COILED SPRING
Original Filed July 18, 1929    3 Sheets-Sheet 3
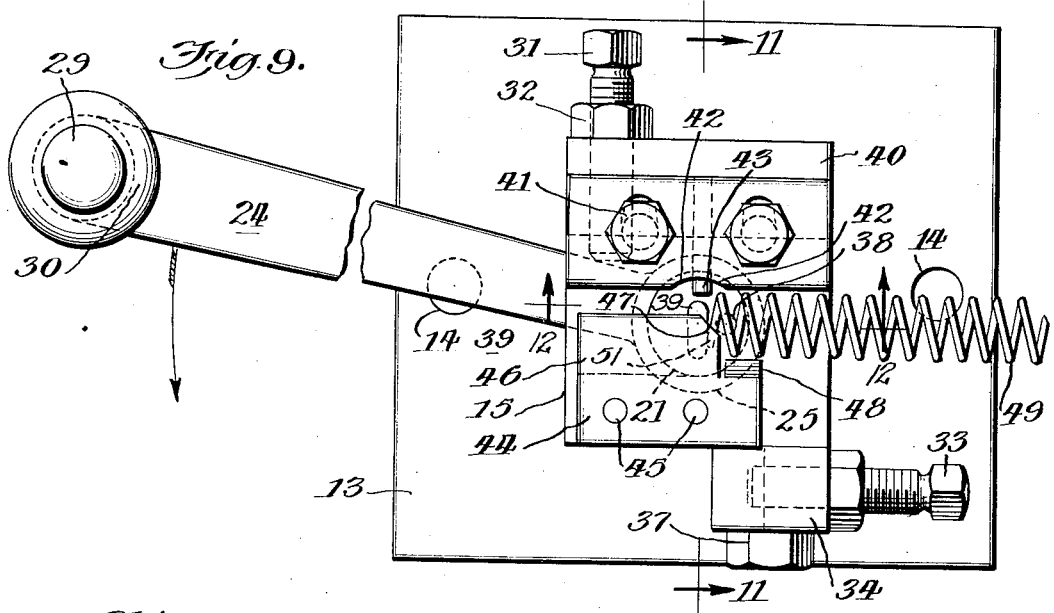
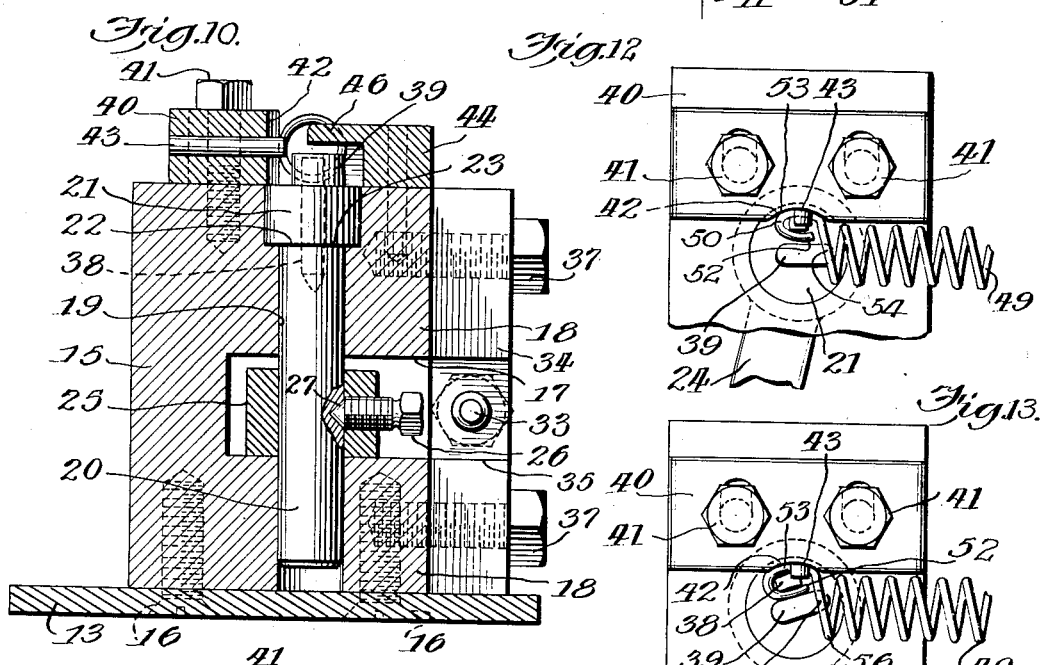
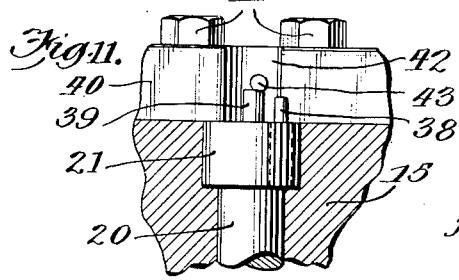
Inventor:
Henry Vanderploeg
By Williams, Bradbury,
McCaleb & Hinkle
Attys.

Patented Aug. 8, 1933

1,921,209

UNITED STATES PATENT OFFICE 1,921,209

HOOK-ENDED COILED SPRING

Henry Vanderploeg, Chicago, Ill., assignor to Haggard & Marcusson Company, Chicago, Ill., a Corporation of Illinois Original application July 18, 1929, Serial No. 379,150. Divided and this application October 31, 1931. Serial No. 572,276

6 Claims. (Cl. 5—269)

My invention relates to hook-ended coiled springs.

More particularly it relates to hook ended springs, commonly termed "helicals", employed to interconnect the top turns or convolutions of coil springs such as used in bed springs and upholstery.

It has long been the practice to interconnect the upper convolutions of the vertical bed and upholstry springs by means of relatively short and compactly coiled springs called helicals. These helicals are usually arranged in pairs, interlaced in crusiform relation and lying horizontally substantially in the plane of the top convolutions of the bed or upholstery springs. The principal function of these helicals is to maintain the upper ends of the bed and upholstery springs in proper relation without detracting from the resiliency of the bed or cushion. Ordinarily the opposite ends of each helical are connected to the upper convolutions of two adjacent bed or upholstery springs and it is, of course, important that they do not become accidentally disconnected when in use. Under the movements of the coil springs the helicals extend and contract and it has long been known that ordinary hooks could not be depended upon to afford a reliable connection between the bed or upholstery springs and the helicals. In consequence it has been the practice to bend or crimp the ends of the helicals into a substantially closed hook or loop about the upper turns or convolutions of the vertical bed or upholstery springs during the assembly of the bed or cushion or to provide the ends of the helicals with preformed substantially closed hooks which were so formed that they could only be associated with the upper convolutions by applying each end of a helical just back of its hook and then, by turning the helical, thread the hook backward into proper relation with the upper convolution.

Both of these prior methods of assembling helicals to the bed or cushion coil springs are objectionable; the first because of the extra expense involved in forming the hooks about the convolutions at the time of assembling them together and the great liability of uncertain and improper connections, and the second, because of the time required in and the difficulty of threading the helicals backwardly so as properly to bring the coil spring convolutions within the hooks.

This application is a division of my copending application Serial No. 379,150, filed July 18, 1929 and which has eventuated into Patent No. 1,880,606, Oct. 4, 1932, in which application the tool herein disclosed is claimed.

One of the objects of my invention is to provide an improved hook-ended helical.

Another object is the provision of coiled springs or helicals with hooks at the terminals thereof, which hooks are so constructed that they may be readily snapped on the top convolutions of an upholstery or bed spring without the necessity of twisting.

A further object is to provide a helical with a hook which, although easily snapped in place upon a bed or upholstery spring, will not become accidentally disengaged.

Other objects and advantages of my invention will hereinafter appear.

In the accompanying drawings:

Fig. 1 is a fragmentary plan view of a bed spring construction incorporating my invention;

Fig. 2 is a view showing the manner of snapping a hook of a helical over the coil of a vertical coil spring;

Fig. 3 is a front elevation at right angles to Fig. 2;

Fig. 4 is a plan view showing the hook fully engaged with the bed spring coil;

Fig. 5 is a view taken on the line 5—5 of Fig. 4;

Fig. 6 is a plan view showing the initial step in disengaging the hook from the coil;

Fig. 7 is a view taken on the line 7—7 of Fig. 6;

Fig. 8 is a perspective view of the tool or machine for carrying out the method of making hooks in coil springs;

Fig. 9 is a plan view thereof;

Fig. 10 is a transverse vertical sectional view taken on the line 11—11 of Fig. 9;

Fig. 11 is a fragmentary sectional view taken on the line 12—12 of Fig. 9;

Fig. 12 is a fragmentary plan view showing another step in the formation of the hook; and Fig. 13 is a similar view showing the final step in the formation of the hook.

Referring first to Fig. 1 of the drawings four typical vertical coil springs 58, such as are commonly used in making bed springs and upholstery, are shown disposed between upper and lower supporting rods or wires 65 and 66. The top convolutions of these four coils are interconnected by an interlaced pair of helicals 49, the opposite ends of which are provided with my improved hook whereby the same may be quickly and reliably attached to the springs, but from which they will not become accidentally detached. The outer rows or border springs—three of which are shown—are connected to a border wire 67 by a common tie wire 68. Preferably the hooks are formed on opposite sides of the helicals as shown, in order that all of the hooks may be applied by forcing them downwardly upon the wire of the associated bed spring coil convolutions and thereby facilitate assembly.

The detailed construction of the improved hook and the method of its application to and removal from a bed or upholstery spring will be explained with particular reference to Figs. 2 to 7. This hook which preferably is formed from an end convolution or turn of the helical has a bight or partial loop 50 which curves gradually from a plane parallel to the convolutions into a plane lying substantially parallel to the axis of the helical and generally in alignment with the undistorted convolutions thereof (i. e. substantially at right angles to a plane parallel to the convolutions). The loop is also reversely curved so that the nose 52 of the hook is bent back to lie between the shank 53 and the outer undistorted or terminal normal convolution 54, pointing backwardly or in a reverse direction so as to form, in association with the adjacent undistorted convolution 54, an inwardly converging passageway 56 between the nose and adjacent convolution (see particularly Fig. 2) and a throat 57 opening into the bight or loop 50 between the nose and shank (see particularly Figs. 3 and 5). The throat 57 is sufficiently wide so that the wire of the bed spring coil 58 may readily pass therethrough in either direction. On the other hand the converging passageway 56 between the nose and the adjacent undistorted or terminal normal convolution narrows or converges inwardly to a dimension which is less than the diameter of the wire of the bed spring coil so that normally the wire cannot pass therethrough. However, because of the taper of this passageway 56 and the resilience of the hook and helical convolution a wire too large normally to pass therethrough may be forced or wedged through in the direction of convergence. Having passed the nose of the hook, the resilience of the helical and hook causes the end of the hook and the adjacent convolution to spring back to normal separation which contracts the converging passageway to a minimum separation which is again less than the diameter of the wire of the bed spring coil, and that wire cannot pass back through the converging passageway in the reverse direction to permit the uncoupling of the helical from the bed spring coil. After being thus forced through the passageway 56 the wire of the bed spring coil will readily enter the loop or bight 50 of the hook through the throat 57 to assume the fully hooked position or relationship shown in Figs. 4 and 5.

The hook is applied, as shown more clearly in Figs. 2 and 3, by first placing the helical so that the wire of the bed spring coil lies in the enlarged portion of the converging passageway 56. Then by exerting pressure against the helical on the side opposite the nose of the hook (i.e., toward the right as viewed in Fig. 2) the wire of the bed spring coil 58 will wedge apart the nose of the hook and the adjacent convolution of the helical, temporarily opening the converging passageway to permit the wire to pass therethrough. As soon as the wire has passed through the restriction in the passageway the nose of the hook and the adjacent convolution of the helical spring back to normal separation, which is less than the diameter of the wire of the bed spring coil, and the wire of the bed spring coil cannot pass in a reverse direction therethrough. The wire of the bed spring coil now lies at the throat of the hook and a slight pull on the helical seats that wire in the loop or bight of the hook, as shown in Figs. 4 and 5. In this condition the wire cannot pass or be forced by ordinary pressure back through the restricted passageway and hence accidental displacement or uncoupling is impossible.

Should it be desirable, however, to remove the helical, disconnection can be deliberately made by rotating the helical on its axis in a clockwise direction whereupon the wire of the bed spring coil is forced through the converging passageway 56 in the same direction as it was applied, as shown in Figs. 6 and 7, which temporarily wedges apart the nose and adjacent convolution readily to permit the wire to be released.

Referring to the Figures 8 to 13 inclusive, there is shown an embodiment of a tool or machine for carrying out the method of making hooks in coil springs and while it will be described as being manually operated, it is to be understood that it may be operated by power and I do not desire to be restricted in this respect.

As illustrated, the device is shown as comprising or having a base 13 in the form of a plate equipped with openings 14 or other means for anchoring the device to a bench or other support. Arranged upon the base plate and constituting part of the frame is a block 15 shown secured in position by screws 16. This block is shown provided with a horizontal kerf or slot 17 extending from one side through the greater portion of its thickness, thus providing a bifurcated member having upper and lower jaws or furcations 18. These jaws are bored through vertically as indicated at 19 to take a vertical shaft 20 which has an enlargement or head 21 at the upper end thereof producing a shoulder 22 facing downwardly and resting upon a corresponding shoulder formed by an enlarged upper or countersunken portion 23 in the block, thus supporting the shaft against downward displacement while permitting it to freely rotate in its bearing. A handle 24 or other means for rotating the shaft may be provided and in the form shown the handle has a collar 25 fixed to the shaft as by means of a set screw 26 which may engage a seat 27 in the shaft to insure positive rotation thereof when the handle is swung in an arc. The handle may be considered a lever or other means which may be power operated for oscillating the shaft and is specifically shown provided at its free end with a reduced portion 28 adapted to take a bolt or spindle 29 on which is rotatably mounted a handle grip 30. However, the free end of the handle or lever is apertured and is thus adapted for connection with power means as a prime mover for oscillating the shaft in a manner to be hereinafter more fully described.

In order to gauge or limit the rotation of the shaft the block or anvil 15 at the back of the slot 17 is shown provided with an adjustable stop in the form of a set screw 31 passing through a threaded opening therein to be engaged by the lever 24 as more particularly shown in Fig. 9 of the drawings. This set screw may be held in adjusted position by a lock nut 32. In the other direction the lever is limited in its movement at the open end of the slot in an arc of slightly greater than 90 degrees by a set screw 33 which passes through the wall of the vertical support or block 34, having a confronting recess 35 at this point. The screw 33 is positioned at right angles to the screw 31 and is held in adjusted position by a lock nut 36. The supporting block 34 may be formed as a part of the block 15 or separate and in the illustration is disposed against the ends of the jaws or bearings 18 and anchored thereto by means of screws 37. It should also be noted that the recess 35 is in line with the slot 17 and the lever 24 travels through the slot 17 and into the recess 35 to be engaged by the set screw 33 which constitutes a stop limiting the movement of the lever in this direction. Of course, both set screws 31 and 33 may be adjusted, thus constituting adjustable stops or limiting means for determining and regulating the proper degree of throw of the lever or other operating means for the shaft.

The head 21 serves as an anvil and is flush with the top of the block 15, as more specifically seen in Fig. 10 of the drawings. This head is provided with a vertical flat sided pin 38 arranged off center and preferably substantially intermediately of the center or axis of the shaft and the periphery of the head 21, and has inner and outer sides flattened as shown. This pin sets in a vertical socket in the shaft. At the axis of the shaft parallel to the flattened sides of the pin 38 is an elongated stud or pin 39 which is likewise positioned in a socket in the shaft or formed thereon and arranged diametrically with its ends terminating in spaced relation to the periphery of the head 21.

A jaw block 40 is mounted transversely upon the top of the block 15 and held by suitable fastenings, such as screws 41, passing vertically into the block 15 or may be formed thereon. This jaw has a vertical curved recess 42 in its operative face concentric to the periphery of the shaft or head 21 thereof and preferably slightly overlying the latter. A horizontal forming pin 43 extends through the jaw 40 at right angles to its length and projects at its inner end from said operative face centrally of the recess 42 so as to lie in close proximity to the adjacent edge or end portion of the flat pin 39, considering the latter as elongated in plan.

Another jaw 44 is mounted upon the block 15 at its opposite side so as to oppose the jaw 40 and may be pinned vertically thereto as indicated at 45. This jaw has an overhanging portion 46 at the top, projecting over the elongated pin 39, which is beveled, as indicated at 47, at its inner corner overlying the pin 39 so as to clear the pin 38 and beyond this overhanging portion the jaw 44 is cut away or recessed to provide an inclined abutment face 48.

In operating the tool to form a hook in the end of a helical, handle 24 is moved to a position against stop 31, as shown in Fig. 9. In this position pin 39 lies substantially in line with pin 43, while pin 38 lies in front of pin 39. One end of the helical is then inserted into the tool between jaws 40 and 44 with its end convolution, which is to be formed into a hook, seated between pins 38 and 39. The helical is then rotated on its axis in a clockwise direction until the end 51 of the first convolution thereof strikes ledge 46, in order to insure that the proper length of wire is provided for the formation of the hook therein and that forming pins 38 and 39 engage the convolution in the proper region. Handle 24 is now rotated in the direction indicated by the arrow in Fig. 9. The resultant rotation of shaft 20 causes forming pins 38 and 39 to rotate in a counterclockwise direction, and since the terminal convolution of the helical is gripped therebetween, that convolution is bent about pin 38 in a plane substantially parallel to the axis of the helical to form the loop 50 of the hook, as shown in Fig. 12. During this bending of the wire into a loop, stationary pin 43 serves as an abutment for preventing the pulling out of place of the second convolution (i. e., the first undistorted or terminal normal convolution) of the helical and causes the wire of the first convolution to be bent thereabout in a direction axially of the helical, as shown most clearly in Fig. 13, to retain the plane of the hook generally in line with the undistorted convolutions of the helical. The result of these two concurrent bending operations is that a hook-loop is formed from the wire of the end helical convolution, and that loop is forced to lie substantially in line with the undistorted convolutions of the helical. When handle 24 has reached the limit of its movement against stop 33, the wire of the end convolution of the helical has been so bent that the nose 52 of the hook lies between shank 53 and the adjacent undistorted or terminal normal convolution 54, pointing backwardly or in a direction reverse to that in which it pointed before being bent; and the nose of the hook and the adjacent undistorted convolution of the helical lie separated to form therebetween an inwardly converging passageway, the minimum separation being less than the diameter of the wire or other article upon which the helical is to be hooked. The throat 57 opening into the loop of the hook is wider, however, than the diameter of the wire to which the helical is to be attached so that, having passed the minimum restriction in the converging passageway 56, the wire may be seated in the loop of the hook.

In order to release the helical from the tool after the hook is formed therein, handle 24 is rotated back to normal position against stop 31, whereupon the helical is ejected or may be easily removed.

Having thus illustrated and described the nature and one embodiment of my invention and of a suitable tool for incorporating it into a bed spring helical, what I claim and desire to secure by United States Letters Patent is as follows:

1. A spring comprising a wire formed into a series of aligned helical convolutions and a hook at one end thereof, said hook having its loop in substantial alignment with the convolutions and parallel to the axis thereof and having its free end reversely directed along but separated from the terminal normal convolution to form therewith a converging passageway the minimum dimension of which is less than the diameter of the article to which the hook is to be applied.

2. A spring having a series of helical convolutions and a hook at one end thereof, said hook having its loop lying at an angle to the convolutions and its nose reversely directed along the terminal normal convolution and separated therefrom at an angle which converges to a dimension less than the diameter of the article to which the hook is to be applied.

3. A spring having a series of helical convolutions and a hook at one end thereof, said hook curving from a plane parallel to the terminal convolution into a plane at an angle thereto and having its loop reversely curved so that the nose lies back along but separated from the adjacent undistorted convolution forming therewith a converging passageway leading to the throat of the hook.

4. A spring comprising a series of helical convolutions with a hook formed at one end thereof, said hook having a bight which lies substantially parallel to the axis of the spring and having its nose lying between its shank and the adjacent convolution to form an inwardly converging passageway between the nose and adjacent convolution, the throat between the nose and shank being wider than the diameter of the article to which the hook is to be applied and the converging passageway reaching a minimum dimension less than such diameter.

5. A helical spring having a terminal hook which lies generally in a plane parallel to the axis of the spring and in substantial alinement with the convolutions thereof, the end of the hook pointing back along the adjacent convolution and with that convolution forming a passageway which converges toward the end of the hook until it reaches a dimension less than the diameter of the article to which the hook is to be applied.

6. A spring having a series of helical convolutions and a hook at one end thereof, said hook having its loop lying at an angle to the convolutions and its nose extending in a direction generally reverse to the direction of the normal terminal convolution and separated therefrom at an angle which converges to a dimension less than the diameter of the article to which the hook is to be applied.

HENRY VANDERPLOEG.